ism such as a UMTS system.
(12) United States Patent
Speight

(10) Patent No.: US 7,286,832 B2
(45) Date of Patent: *Oct. 23, 2007

(54) METHOD AND ARRANGEMENT FOR ALLOCATION OF RESOURCES IN A RADIO COMMUNICATION SYSTEM

(75) Inventor: Timothy James Speight, Bristol (GB)

(73) Assignee: IPWireless, Inc., San Bruno, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 11/241,043

(22) Filed: Sep. 30, 2005

(65) Prior Publication Data

US 2006/0030301 A1 Feb. 9, 2006

Related U.S. Application Data

(63) Continuation of application No. 10/279,697, filed on Oct. 24, 2002, now Pat. No. 7,062,278.

(30) Foreign Application Priority Data

Oct. 24, 2001 (GB) .................................. 0125486.1

(51) Int. Cl.
*H04Q 7/20* (2006.01)
*H04Q 7/00* (2006.01)

(52) U.S. Cl. ...................... 455/453; 455/450; 455/509; 455/452.1; 455/452.2; 370/329; 370/232; 370/235

(58) Field of Classification Search ................ 455/453, 455/450, 509, 452.1, 452.2; 370/329, 232, 370/235
See application file for complete search history.

(56) References Cited

U.S. PATENT DOCUMENTS 4,670,899 A 6/1987 Brody et al.

(Continued)

FOREIGN PATENT DOCUMENTS

GB 2343589 A 5/2000

(Continued)

OTHER PUBLICATIONS

International Search Report for PCT Application No. PCT/GB02/04832 filed on Oct. 24, 2002, mailed on Jan. 15, 2003, four pages.

(Continued)

*Primary Examiner*—George Eng
*Assistant Examiner*—Huy Q. Phan
(74) *Attorney, Agent, or Firm*—Morrison & Foerster LLP

(57) ABSTRACT

A method and arrangement for fair control of resources amongst users with different instantaneous throughputs in a radio communication system such as a UMTS system. Respective indications of users among whom resources are to be allocated are placed in a 'round robin' queue (200) and each user whose indication is at the head of the queue is allocated a number of resource units as a function of: $\beta$, a predetermined parameter determining the extent to which a fixed number of resource units should be allocated to the user and the extent to which a fixed volume of data should be transferred from/to the user; $\phi$, the volume of data that the user is allowed to transfer if $\beta=1$; $\lambda$, the number of resource units that can be allocated if $\beta=0$; and $\theta$, the number of information bits per resource unit that can be transferred to/from the user. This provides the following advantages: the resources can be allocated in the manner chosen by the operator, the function requires very few input parameters, and so is simple to operate.

27 Claims, 4 Drawing Sheets

U.S. PATENT DOCUMENTS

| | | | |
|---|---|---|---|
| 5,241,685 A | 8/1993 | Bodin et al. | |
| 5,594,940 A | 1/1997 | Peterson et al. | |
| 6,072,787 A | 6/2000 | Hamalainen et al. | |
| 6,240,079 B1 | 5/2001 | Hamalainen et al. | |
| 6,459,901 B1 * | 10/2002 | Chawla et al. | 455/450 |
| 6,850,540 B1 * | 2/2005 | Peisa et al. | 370/468 |
| 6,928,268 B1 * | 8/2005 | Kroner | 455/69 |
| 2002/0037729 A1 | 3/2002 | Kitazawa et al. | |
| 2002/0193118 A1 | 12/2002 | Jain et al. | |

FOREIGN PATENT DOCUMENTS

| | | |
|---|---|---|
| WO | WO-99/57925 A1 | 11/1999 |
| WO | WO-00/10334 A2 | 2/2000 |
| WO | WO-00/10334 A3 | 2/2000 |
| WO | WO-00/54438 A1 | 9/2000 |
| WO | WO-01-01722 A1 | 1/2001 |
| WO | WO-01/74027 A1 | 10/2001 |
| WO | WO-03-037025 A1 | 5/2003 |

OTHER PUBLICATIONS

UK Search Report for Application No. GB 0125486.1 filed on Oct. 12, 2001, issued on Apr. 27, 2002, one page.

* cited by examiner

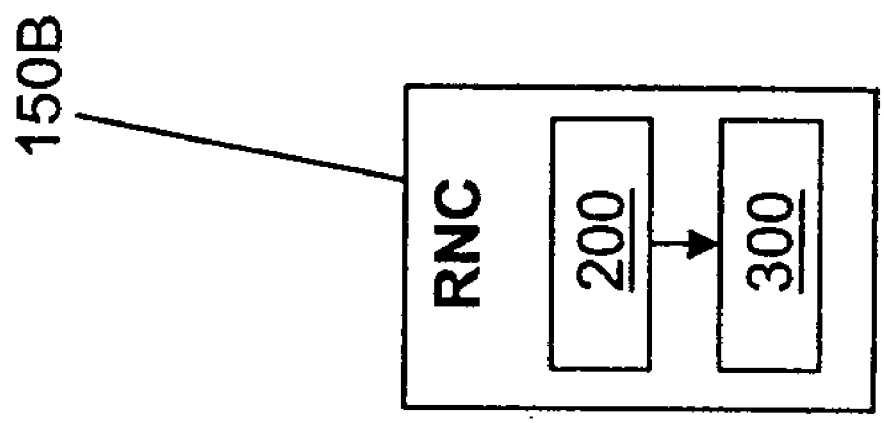

METHOD AND ARRANGEMENT FOR ALLOCATION OF RESOURCES IN A RADIO COMMUNICATION SYSTEM

CROSS-REFERENCE TO RELATED APPLICATIONS

This application is a continuation of U.S. application Ser. No. 10/279,697 (allowed), filed Oct. 24, 2002 now U.S. Pat. No. 7,062,278, entitled "Method and Arrangement for Allocation of Resources in a Radio Communication System", which claims the benefit of United Kingdom application GB 0125486.1 filed Oct. 24, 2001. The contents of these documents are incorporated herein by reference.

FIELD OF THE INVENTION

This invention relates to packet-based radio communication systems employing shared channels for data transfer.

BACKGROUND OF THE INVENTION

In a system employing shared channels, a portion of the shared resource is allocated to user equipment (UEs) on a round-by-round basis. The amount of the shared resource allocated to a user is measured in the smallest individual unit of the shared resource that can be allocated; this is called a resource unit.

Depending on the prevailing radio channel conditions the number of information bits that can be transferred in each resource unit will vary. It is likely that in a cellular system the number of bits transferred per resource unit will vary greatly across the coverage area of the cell.

In this environment it is desirable to provide the same overall throughput to packet users regardless of the radio conditions they experience.

Conventionally Either:
The number resource units allocated per round of allocation is fixed, regardless of the number of information bits that can be transferred in each resource unit.
or
Resource units are allocated so that an equal volume of data is transferred to each user in each round of allocation.

Allocating a fixed number of resource units per round of allocation to all users has the disadvantage that some users will experience very much poorer throughputs than others. However, this method has the advantage that overall throughput in the cell will be maximised.

Allocating the appropriate number of resources so that a fixed volume of data is transferred has the disadvantage that overall cell throughput is reduced. However, this method has the advantage of providing even throughput to all users irrespective of their channel conditions.

The optimum condition required by the operator of the system may lie somewhere between these two extremes.

A need therefore exists for control of resources amongst users with different instantaneous throughputs wherein the abovementioned disadvantage(s) may be alleviated.

STATEMENT OF INVENTION n accordance with a first aspect of the present invention there is provided a method for allocation of resources amongst users in a radio communication system, the method comprising:
storing respective indications of users among whom resources are to be allocated; and
repetitively allocating predefined resource units in turn to each user whose indication is stored, the number, $\gamma$, of resource units allocated to a user being a function of:
$\phi$, the volume of data that the user is allowed to transfer if a fixed volume of data is transferred;
$\lambda$, the number of resource units that can be allocated to a user if a fixed number of resource units is allocated to the user;
$\theta$, the number of information bits per resource unit that can be transferred to/from the user; and
$\beta$, a predetermined parameter determining the extent to which a fixed number of resource units should be allocated to the user and the extent to which a fixed volume of data should be transferred from/to the user.

In accordance with a second aspect of the present invention there is provided an arrangement for allocation of resources amongst users in a radio communication system, the arrangement comprising:
means for storing respective indications of users among whom resources are to be allocated; and
means for repetitively allocating predefined resource units in turn to each user whose indication is stored, the number, $\gamma$, of resource units allocated to a user being a function of:
$\phi$, the volume of data that the user is allowed to transfer if a fixed volume of data is transferred;
$\lambda$, the number of resource units that can be allocated to a user if a fixed number of resource units is allocated to the user;
$\theta$, the number of information bits per resource unit that can be transferred to/from the user; and
$\beta$, a predetermined parameter determining the extent to which a fixed number of resource units should be allocated to the user and the extent to which a fixed volume of data should be transferred from/to the user.

BRIEF DESCRIPTION OF THE DRAWINGS

One method and arrangement for 'fair' control of resources in a radio communication system amongst users with different instantaneous throughputs incorporating the present invention will now be described, by way of example only, with reference to the accompanying drawings, in which:

FIG. 4 shows a block diagrammatic representation of an RNC element of the system of FIG. 1 incorporating the resource allocation arrangement of FIG. 2.

DESCRIPTION OF PREFERRED EMBODIMENT

Figure 1:
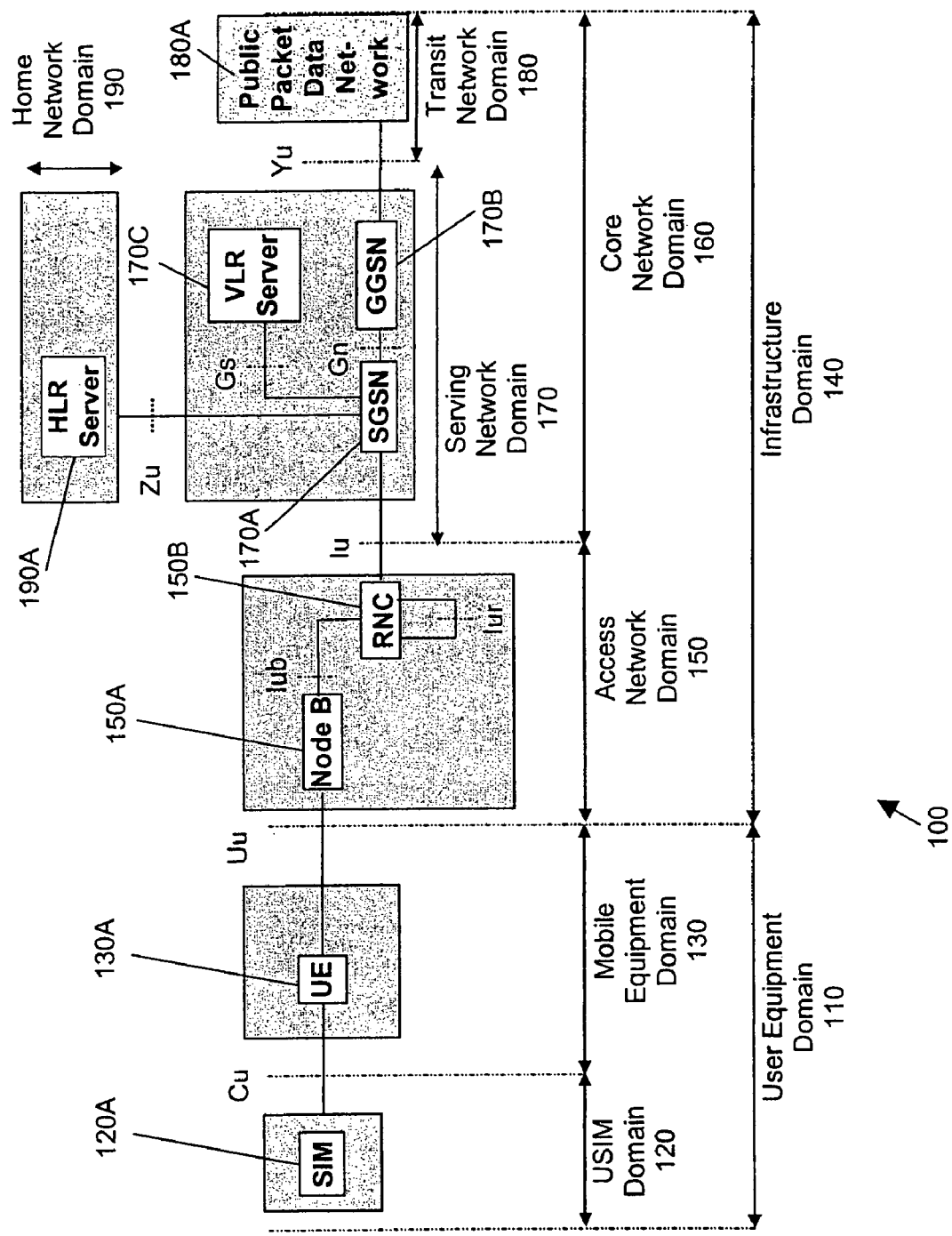
FIG. 1 shows a block diagrammatic representation of a UMTS system in which the present invention is used.

Referring firstly to FIG. 1, a typical, standard UMTS network (100) is conveniently considered as comprising: a user equipment domain (110), made up of a user SIM (USIM) domain (120) and a mobile equipment domain (130); and an infrastructure domain (140), made up of an access network domain (150), and a core network domain (160), which is in turn made up of a serving network domain (170) and a transit network domain (180) and a home network domain (190).

In the mobile equipment domain (130), user equipment UE (130A) receives data from a user SIM (120A) in the USIM domain 120 via the wired Cu interface. The UE (130A) communicates data with a Node B (150A) in the network access domain (150) via the wireless Uu interface.

Within the network access domain (150), the Node B (150A) communicates with a radio network controller or RNC (150B) via the Iub interface. The RNC (150B) commmunicates with other RNC's (not shown) via the Iur interface. The RNC (150B) communicates with a SGSN (170A) in the serving network domain (170) via the Iu interface. Within the serving network domain (170), the SGSN (170A) communicates with a GGSN (170B) via the Gn interface, and the SGSN (170A) communicates with a VLR server (170C) via the Gs interface. The SGSN (170A) communicates with an HLR server (190A) in the home network domain (190) via the Zu interface. The GGSN (170B) communicates with public data network (180A) in the transit network domain (180) via the Yu interface.

Thus, the elements RNC (150B), SGSN (170A) and GGSN (170B) are conventionally provided as discrete and separate units (on their own respective software/hardware platforms) divided across the access network domain (150) and the serving network domain (170), as shown the FIG. 1.

The RNC (150B) is the UTRAN (UMTS Terrestrial Radio Access Network) element responsible for the control and allocation of resources for numerous Node B's (150A); typically 50 to 100 Node B's may be controlled by one RNC. The RNC also provides reliable delivery of user traffic over the air interfaces. RNC's communicate with each other (via the interface Iur) to support handover and macrodiversity.

The SGSN (170A) is the UMTS Core Network element responsible for Session Control and interface to the Location Registers (HLR and VLR). The SGSN is a large centralized controller for many RNCs.

The GGSN (170B) is the UMTS Core Network element responsible for concentrating and tunnelling user data within the core packet network to the ultimate destination (e.g., internet service provider—ISP).

The present invention, at least in its preferred embodiment, uses a 'round robin' queuing mechanism in allocating resources to users. 'Round robin' is a well-known scheduling technique in which processes are activated in a fixed cyclic order.

Figure 2:
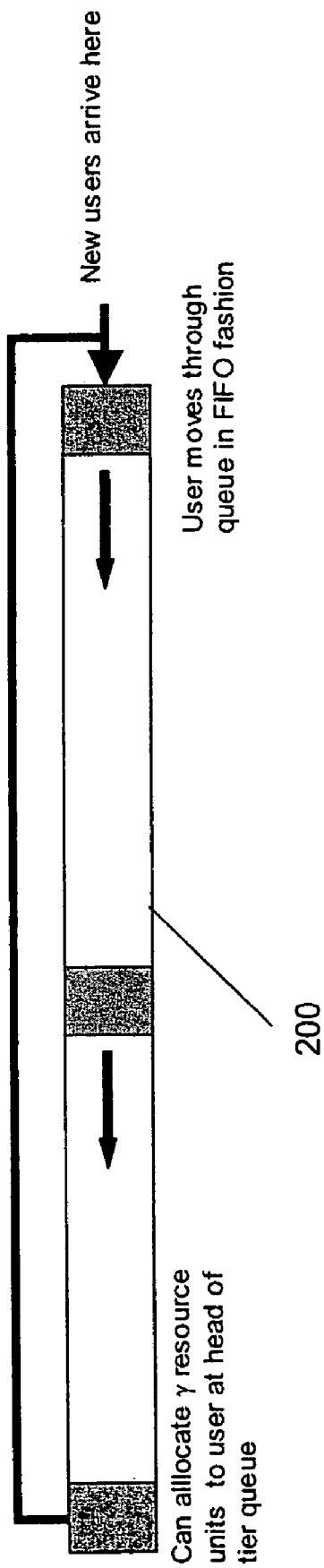
FIG. 2 depicts schematically a 'round robin' queue scheme used in resource allocation in accordance with the present invention.

Referring now also to FIG. 2, which depicts a 'round robin' queue used for resource allocation. As users arrive, i.e., when a user has data to transfer, a number representing the user is stored or placed at the tail of a queue 200. In each round of allocation, resources are allocated to a user at the head of the queue. When the user at the head of the queue has been allocated a fixed amount of resource, $\gamma$, that user is returned to the tail of the queue, and the number of the next user moves to the head of the queue. Thus, it will be appreciated, each user number moves through the queue 200 in FIFO (first-in, first-out) manner.

In keeping with the present invention, a fairness parameter, $\beta$, is defined that allows an optimum condition between allocating even, overall throughput to users and allocating even numbers of resource units to users.

When $\beta=0$ then irrespective of the number of information bits per resource unit that can be transferred to/from the user's UE, a fixed number of resource units will be allocated to the user whose number is at the head of the queue.

When $\beta=1$ then a fixed volume of data is transferred from/to a UE whose number is at the head of the queue.

$\beta$ can take any value between 0 and 1. When it is at an intermediate value then a compromise is effected between a fixed number of resource units being allocated to the user and a fixed volume of data being transferred from/to the UE.

Let $\gamma$ be the overall number of resource units that can be allocated to a user when at the head of the 'round robin' queue when the scheme described is used.

Let $\phi$ be the volume of data that a user is allowed to transfer when at the head of the 'round robin' queue if $\beta$ is set to 1.

Let $\lambda$ be the number of resource units that can be allocated to a user when at the head of the 'round robin' queue if $\beta$ is set to 0.

Let $\theta$ be the number of information bits per resource unit that can be transferred to/from the UE. This information is available for each UE in the system.

The number of resource units that are allocated to a user at the head of the queue is now calculated using the function shown below $$\gamma = \left| (1-\beta)*\lambda + \beta\left(\frac{\phi}{\theta}\right) \right| \quad (1)$$

Figure 3:
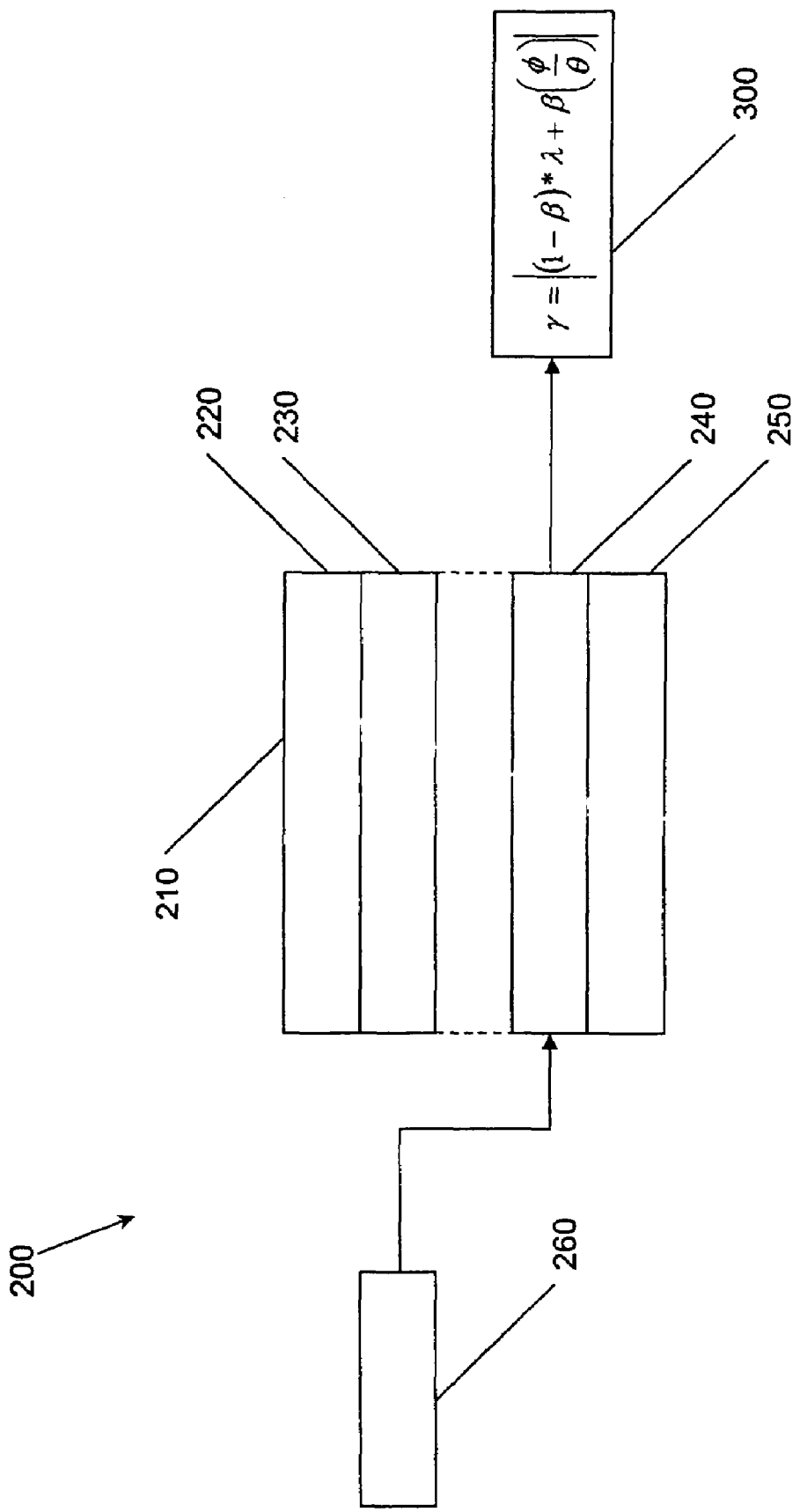
FIG. 3 shows a possible implementation of the queue scheme of FIG. 2.

Referring now also to FIG. 3, a possible implementation of the FIFO queue 200 includes a block of RAM semiconductor memory 210 having a number of memory locations of which four 220, 230, 240 & 250, are shown. A register 260 is used to hold a value pointing to the memory location in the RAM 210 which constitutes the head of the queue. With each round of resource allocation, the value in the register 260 is decremented to point to the previous memory location (e.g., before decrementing the register 260 points to memory location 250, and after decrementing the register 260 points to memory location 240 as shown). The user whose number is in the memory location at the head of the queue is allocated a fixed amount of resource, $\gamma$, in accordance with the formula (1) as described above—this is depicted at 300.

It will be understood that when the register 260 points to the memory location 220, after decrementing the register will point to the memory location 260, so that in this way the queue implemented by the RAM 210 and pointer register 260 will operate in 'wrap-around' manner. Also, it will be understood that the number of the user to whom resources have been allocated will automatically be moved to the tail of the queue when the register 260 is decremented to point to the previous memory location. Further, it will be understood that when a new user number is to be added to the tail of the queue, the user number is inserted at the next memory location beyond that pointed to by the register 260 (e.g., if the register 260 points to memory location 240 as shown, then the tail of the queue is at memory location 250).

In keeping with the present invention, the queue arrangement 200 and resource allocation calculation mechanism 300 may conveniently be provided in the RNC 150B, within the radio access network, as shown in FIG. 4.

It will be understood that the above scheme for 'fair' control of resources allows users with different instantaneous throughputs to be successfully accommodated.

It will be appreciated that the fair resource allocation scheme described above provides the advantage that resources may be allocated in the manner chosen by the operator (dependent on choice of the value $\beta$). This can be anywhere between the extremes of allocating a fixed number of resource units to all users (resulting in maximum overall cell throughput) and allocating resource units so as to transfer a fixed number of information bits (resulting in the same overall throughput for all users).

It will also be appreciated that the formula used in equation (1) above requires very few input parameters, the only knowledge required being the number of information bits per resource unit.

It will be appreciated that the method described above for allocating resources among with different instantaneous throughputs may be carried out principally in software running on a processor (not shown), and that the software may be provided as a computer program element carried on any suitable data carrier (also not shown) such as a magnetic or optical computer disc.

It will be also be appreciated that the arrangement described above for allocating resources among with different instantaneous throughputs may be provided in an integrated circuit (not shown) such as an FPGA (Field Programmable Gate Array) or ASIC (Application Specific Integrated Circuit).

The invention claimed is:

1. A method for allocating data communication resource units by a communication infrastructure among a plurality of user equipment in a wireless communication system, comprising:

storing respective indicia of the plurality of user equipment among which data communication resources are to be allocated; and allocating a number of resource units to each of the plurality of user equipment having a respective stored indicia, wherein the number, $\gamma$, of resource units allocated to the user equipment is based at least upon:

$\phi$, the volume of data that the user equipment is allowed to communicate if a fixed volume of data is to be communicated with the infrastructure;

$\lambda$, the number of resource units that can be allocated to the user equipment to communicate with the infrastructure if a fixed number of resource units is to be allocated to the user equipment;

$\theta$, the number of information bits per resource unit that can be communicated between the user equipment and the infrastructure; and $\beta$, a predetermined fairness parameter ranging from a minimum value to a maximum value that specifies the extent to which $\lambda$ resource units should be communicated between the user equipment and the infrastructure, and the extent to which a fixed volume of data, $\phi$, should be communicated between the user equipment and the infrastructure.

2. The method of claim 1 wherein the storing of the respective indicia of the plurality of user equipment among which resource units are to be allocated further comprises storing the indicia in a FIFO queue.

3. The method of claim 1 wherein the storing of the respective indicia of the plurality of user equipment among which resource units are to be allocated further comprises storing the indications in a RAM memory with an associated pointer register.

4. The method of claim 1 performed in a radio network controller of the wireless communication system.

5. The method of claim 1 wherein the wireless communication system is a UMTS system.

6. The method of claim 1 wherein $\beta$ is normalized to range between zero and one.

7. The method of claim 6, wherein the number, $\gamma$, of resource units allocated to a user is substantially equal to the absolute value of $[(1-\beta)*\lambda+\beta*(\phi/\theta)]$.

8. A method for obtaining a data communication resource unit allocation by user equipment in a wireless communication system having an infrastructure, comprising:

receiving data from a SIM of the user equipment;

communicating the data received from the user equipment's SIM with the infrastructure; and receiving at least one allocation, $\gamma$, of resource units from the infrastructure, the allocation being based at least upon:

$\phi$, the volume of data that the user equipment is allocated to communicate with the infrastructure, if a fixed volume of data is to be communicated;

$\lambda$, the number of resource units that can be allocated to the user equipment to communicate with the infrastructure, if a fixed number of resource units is to be allocated for communication between the user equipment and the infrastructure;

$\theta$, the number of information bits per resource unit that can be communicated between the user equipment and the infrastructure; and $\beta$, a fairness parameter ranging from a minimum value to a maximum value that specifies the extent to which $\lambda$ resource units should be communicated between the user equipment and the infrastructure, and the extent to which a $\phi$ volume of data should be communicated between the user equipment and the infrastructure.

9. The method of claim 8 further comprising communicating data with the infrastructure according to the received resource unit allocation.

10. A computer-readable medium having computer-executable instructions for performing a method for allocating data communication resource units by a communication infrastructure among a plurality of user equipment in a wireless communication system, comprising:

storing respective indicia of the plurality of user equipment among which data communication resource units are to be allocated; and allocating a number of resource units to each of the plurality of user equipment having a respective stored indicia, wherein the number, $\gamma$, of resource units allocated to the user equipment is based at least upon:

$\phi$, the volume of data that the user equipment is allocated to communicate with the infrastructure, if a fixed volume of data is to be communicated;

$\lambda$, the number of resource units that can be allocated to the user equipment to communicate with the infrastructure, if a fixed number of resource units is to be allocated for communication between the user equipment and the infrastructure;

$\theta$, the number of information bits per resource unit that can be communicated between the user equipment and the infrastructure; and $\beta$, a predetermined fairness parameter ranging from a minimum value to a maximum value that specifies the extent to which $\lambda$ resource units should be communicated between the user equipment and the infrastructure, and the extent to which a $\phi$ volume of data should be communicated between the user equipment and the infrastructure.

11. The computer-readable medium of claim 10, further comprising computer-executable instructions normalize $\beta$ to range between zero and one.

12. The computer-readable medium of claim 11, further comprising computer-executable instructions to calculate the number, $\gamma$, of resource units allocated to a user as substantially equal to the absolute value of $[(1-\beta)*\lambda+\beta*(\phi/\theta)]$.

13. The computer-readable medium of claim 10, further comprising computer-executable instructions wherein the storing of the respective indicia of the plurality of the user equipment among which resource units are to be allocated further comprises storing the indications in a FIFO queue.

14. The computer-readable medium of claim 10, further comprising computer-executable instructions wherein the storing of the respective indicia of the plurality of the user equipment among which resource units are to be allocated further comprises storing the indicia in a RAM memory with an associated pointer register.

15. The computer-readable medium of claim 10, wherein the computer-executable instructions are configured to be executed by a processor in a radio network controller of the wireless communication system.

16. The computer-readable medium of claim 15, wherein the computer executable instructions are configured to by executed by a processor in a radio network controller of a UMTS system.

17. A computer-readable medium having computer-executable instructions for performing a method for obtaining a data communication resource unit allocation by user equipment in a wireless communication system having an infrastructure, the method comprising:
  receiving data from a SIM of the user equipment;
  communicating the data received from the user equipment's SIM with the infrastructure; and
  receiving at least one resource unit allocation, $\gamma$, of resource units from the infrastructure, the allocation being based at least upon:
    $\phi$, the volume of data that the user equipment is allocated to communicate with the infrastructure, if a fixed volume of data is to be communicated;
    $\lambda$, the number of resource units that can be allocated to the user equipment to communicate with the infrastructure, if a fixed number of resource units is to be allocated for communication between the user equipment and the infrastructure;
    $\theta$, the number of information bits per resource unit that can be communicated between the user equipment and the infrastructure; and
    $\beta$, a fairness parameter ranging from a minimum value to a maximum value that specifies the extent to which $\lambda$ resource units should be communicated between the user equipment and the infrastructure, and the extent to which a $\phi$ volume of data should be communicated between the user equipment and the infrastructure.

18. The computer-readable medium of claim 17, further comprising computer executable instructions to communicate data with the infrastructure according to the received resource unit allocation.

19. Wireless communication system infrastructure equipment configured to perform a method for allocating data communication resource units among a plurality of user equipment in a wireless communication system, comprising:
  a memory for storing respective indicia of the plurality of user equipment among which data communication resources are to be allocated; and
  a processor for allocating a number of resource units to each of the plurality of user equipment having a respective stored indication, wherein the number, $\gamma$, of resource units allocated to user equipment is based at least upon:
    $\phi$, the volume of data that the user equipment is allocated to communicate with the infrastructure, if a fixed volume of data is to be communicated;
    $\lambda$, the number of resource units that can be allocated to the user equipment to communicate with the infrastructure, if a fixed number of resource units is to be allocated for communication between the user equipment and the infrastructure;
    $\theta$, the number of information bits per resource unit that can be communicated between the user equipment and the infrastructure; and
    $\beta$, a predetermined fairness parameter ranging from a minimum value to a maximum value that specifies the extent to which $\lambda$ resource units should be communicated between the user equipment and the infrastructure, and the extent to which a $\phi$ volume of data should be communicated between the user equipment and the infrastructure.

20. The infrastructure equipment of claim 19, wherein the processor is further configured to normalize $\beta$ to range between zero and one.

21. The infrastructure equipment of claim 20, wherein the processor is further configured to calculate the number, $\gamma$, of resource units allocated to a user as substantially equal to the absolute value of $[(1-\beta)*\lambda+\beta*(\phi/\theta)]$.

22. The infrastructure equipment of claim 19, wherein the processor is further configured to store the respective indicia of the plurality of user equipment among which resource units are to be allocated in a FIFO queue.

23. The infrastructure equipment of claim 19, wherein the processor is further configured to store the respective indicia of the plurality of user equipment among which resource units are to be allocated in a RAM memory with an associated pointer register.

24. The infrastructure equipment of claim 19, further comprising a radio network controller of the wireless communication system.

25. The infrastructure equipment of claim 24, wherein the wireless communication is a UMTS system.

26. A user equipment configured to perform a method for obtaining a data communication resource unit allocation by a user equipment in a wireless communication system having an infrastructure, comprising:
  a user equipment's subscriber information module, SIM;
  a wired receiver configured to receive data from the user equipment's SIM;
  a radio transmitter configured to transmit the data received from the user equipment's SIM to the infrastructure; and
  a radio receiver configured to receive at least one resource unit allocation, $\gamma$, of resource units from the infrastructure, the allocation being based at least upon:
    $\phi$, the volume of data that the user equipment is allocated to communicate with the infrastructure, if a fixed volume of data is to be communicated;
    $\lambda$, the number of resource units that can be allocated to the user equipment to communicate with the infrastructure, if a fixed number of resource units is to be allocated for communication between the user equipment and the infrastructure;
    $\theta$, the number of information bits per resource unit that can be communicated between the user equipment and the infrastructure; and
    $\beta$, a fairness parameter ranging from a minimum value to a maximum value that specifies the extent to which $\lambda$ resource units should be communicated between the user equipment and the infrastructure, and the extent to which a $\phi$ volume of data should be communicated between the user equipment and the infrastructure.

27. The user equipment of claim 26, further configured to communicate data with the infrastructure according to the received resource unit allocation.

* * * * *